United States Patent
Milana et al.

(10) Patent No.: US 9,438,570 B2
(45) Date of Patent: Sep. 6, 2016

(54) CONSUMER-DRIVEN SECURE SOCKETS LAYER MODULATOR

(75) Inventors: Joseph P. Milana, San Diego, CA (US); Stuart L. Crawford, Piedmont, CA (US); Ronald L. Martin, San Diego, CA (US)

(73) Assignee: FAIR ISAAC CORPORATION, Minneapolis, MN (US)

( * ) Notice: Subject to any disclaimer, the term of this patent is extended or adjusted under 35 U.S.C. 154(b) by 830 days.

(21) Appl. No.: 11/705,663

(22) Filed: Feb. 12, 2007

(65) Prior Publication Data

US 2007/0291936 A1 Dec. 20, 2007

Related U.S. Application Data

(60) Provisional application No. 60/772,248, filed on Feb. 10, 2006.

(51) Int. Cl.
| | |
|---|---|
| *G06Q 20/00* | (2012.01) |
| *H04L 29/06* | (2006.01) |
| *G06Q 20/38* | (2012.01) |
| *G07F 7/08* | (2006.01) |

(52) U.S. Cl.
CPC ........... *H04L 63/0442* (2013.01); *G06Q 20/38* (2013.01); *G06Q 20/382* (2013.01); *G07F 7/084* (2013.01); *H04L 63/166* (2013.01)

(58) Field of Classification Search
CPC .................................................. G06Q 20/382
USPC ......................................................... 705/64
See application file for complete search history.

(56) References Cited

U.S. PATENT DOCUMENTS

| | | | | |
|---|---|---|---|---|
| 6,362,751 B1* | 3/2002 | Upparapalli | ..... | G08G 1/096811 340/995.19 |
| 2002/0095607 A1* | 7/2002 | Lin-Hendel | ............. | G06F 21/55 726/24 |
| 2003/0065919 A1 | 4/2003 | Albert et al. | | |
| 2003/0098882 A1* | 5/2003 | Cowden | ................ | G06F 9/4443 715/781 |
| 2005/0203855 A1* | 9/2005 | Malcolm | ............... | G06F 21/606 705/64 |
| 2005/0265327 A1* | 12/2005 | Buch | ....................... | H04L 63/10 370/389 |
| 2006/0294462 A1* | 12/2006 | Blair | ..................... | G06F 3/0237 715/201 |
| 2008/0022133 A1* | 1/2008 | Sobel | .................. | G06F 21/6218 713/193 |

FOREIGN PATENT DOCUMENTS

| | | | | |
|---|---|---|---|---|
| HU | WO 2007135145 A2 * | 11/2007 | ....... | H04L 29/06027 |
| WO | WO 2007/095157 A2 | 8/2007 | | |

OTHER PUBLICATIONS

U.S. Appl. No. 11/234,692, filed Sep. 22, 2005, Matthias Blume.
International Search Report for related patent PCT/US2007/03650 performed by International Searching Authority/US on Nov. 17, 2008.
Written Opinion for related patent PCT/US2007/03650 performed by International Searching Authority/US on Nov. 17, 2008.

* cited by examiner

*Primary Examiner* — James A Reagan
(74) *Attorney, Agent, or Firm* — Mintz Levin Cohn Ferris Glovsky and Popeo, P.C.

(57) ABSTRACT

A software system and method for executing secure commercial transactions online is disclosed. The system intercepts and verifies, against consumer provided inputs, Secure Socket Layer (SSL) communications from normal Web browser usage. The system can include a software module loaded onto the consumer's client computer, and which uses independently-derived look-ups to associate a web domain name with its SSL public key to verify that a given web session is appropriately encrypted.

14 Claims, 2 Drawing Sheets

CONSUMER-DRIVEN SECURE SOCKETS LAYER MODULATOR

CROSS REFERENCE TO RELATED APPLICATION

The present patent application claims priority under 35 U.S.C. §119 to U.S. Provisional Patent Application Ser. No. 60/772,248 filed on Feb. 10, 2006, and entitled, "Consumer-Driven SSL Modulator" the entire disclosure of which is incorporated by reference herein.

BACKGROUND

Many online commercial activities such as online banking and other financial transactions are vulnerable to "phishing" and other crimes such as Domain Name Service (DNS) poisoning and counterfeit or spoofed web addresses, by which the consumer is tricked into divulging to criminal entities personal information necessary to log onto the consumer's account. These crimes exploit a readily identifiable vulnerability in online security: the consumer cannot verify with whom they are communicating.

SUMMARY

This document describes a software system that combats the above described forms of security breaches. The system accomplishes this by intercepting and verifying, against consumer provided inputs, Secure Socket Layer (SSL) communications from normal Web Browser usage. The software is loaded onto the consumer's personal computer (PC) and uses independently-derived look-ups to associate a web domain name with its SSL public key to verify that a given web session is appropriately encrypted.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
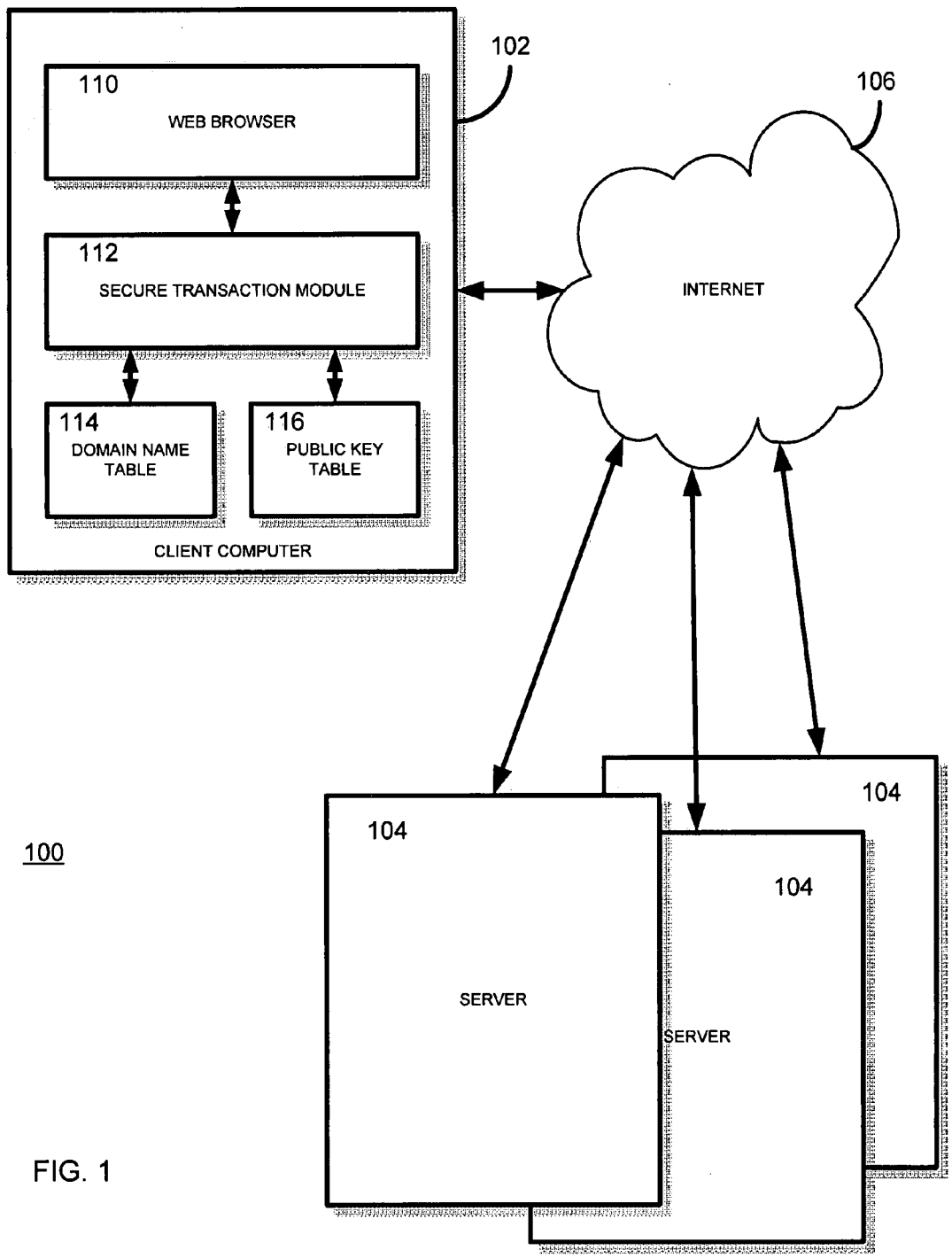
FIG. 1 is a network for performing secured commercial transactions.

This document describes a security system for online commercial transactions. FIG. 1 is a block diagram of a security system 100 in which requested commercial information is delivered to a client computer 102 from one or more servers 104. The security system 100 ensures that only an intended recipient can read the delivered information by leveraging existing e-commerce security infrastructure, such as the SSL, but removing the anonymity of normal exchanges of a Web browser 110 of the client computer 102.

A secure transaction module 112, preferably a software program that is loaded on the client computer 102, provides an independent mechanism to verify any exchange against a consumer-specified allowed list of recipients of confidential information, while the SSL utilizes time-proven asymmetric cryptographic algorithms to secure the exchange of information. The secure transaction module 112 intercepts communications from the client computer 102 to the one or more servers 104, and verifies the communications by independently-derived look-ups to a domain name table 114 and public key table, to associate a web domain name with its SSL public key.

Asymmetric algorithms invoke two encryption keys: a "public" key that is widely distributed, and a "private" key, known only by the one party (e.g. a bank or internet merchant) with whom each member of the public conducts business. A message encrypted by a given public key can only be decrypted by the owner of the associated private key. The encryption algorithms are publicly known, and their security, i.e. the inability to derive the secret private key from the public key, stems from invoking an unsolved problem in number theory to relate the two keys.

For example, RSA encryption, developed by Rivest, Shamir and Aldeman in 1977, and which has become the de-facto standard for Internet communications, is based upon the unsolved problem of efficiently (i.e. short of an exhaustive search) factorizing a large number into its component primes. More precisely, RSA encryption uses a large integer composed of two prime numbers. The present invention utilizes an infrastructure such as RSA encryption to ensure that all confidential information is encrypted using a public key associated with one of the consumer's pre-determined list of allowed recipients.

Figure 2:
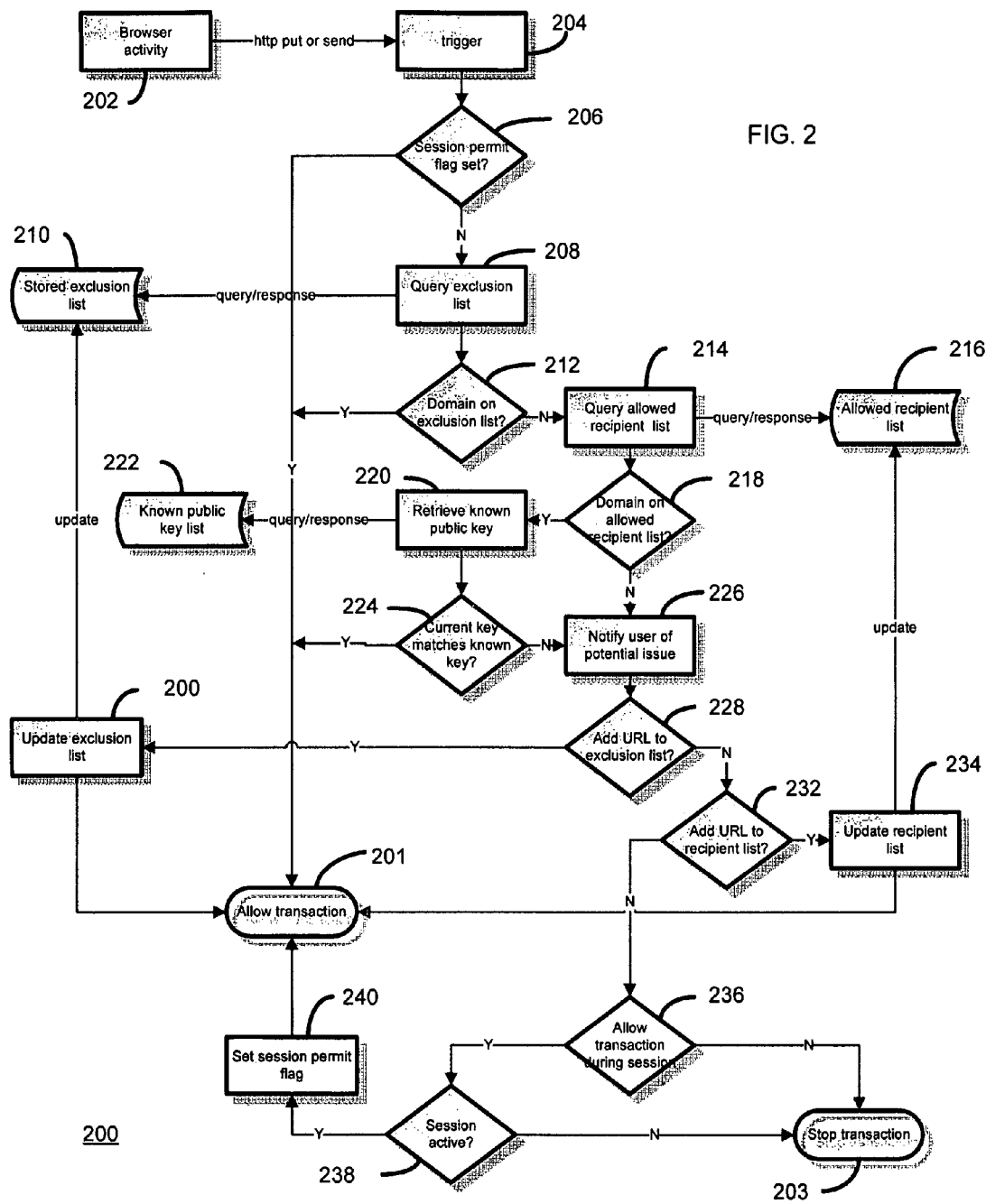
FIG. 2 is a functional flow diagram of a security system in accordance with an exemplary embodiment.

The system monitors all Hypertext Transfer Protocol (HTTP) Internet exchanges (i.e. messages transmitted typically through Transmission Control Protocol (TCP) ports 80 and 443). As shown in FIG. 2, at 202 all HTTP "POST" and "PUT" events (i.e., where the client computer is sending information) trigger a security look-up by the secure transaction module, at 204. At 206, a determination is made whether the session permits a flag to be set. If yes, the transaction is allowed, at 201. Next, at 208, an exclusion list (210) is queried. The secure transaction module requires that unless the recipient's domain name is on a pre-determined exclusion list, at 212, only POST and PUT transactions encrypted with a recognized public key are allowed, at 201.

If the domain is not on the exclusion list (210), the process continues and at 214 a query is made whether the domain is on an allowed recipient list (216). Verification is performed in several steps. First, at 218 the domain name of the intended recipient is compared against the pre-set, consumer specified list of allowed recipient domain names (216) for receiving confidential information. If the domain name of the present communication is not found, the secure transaction module intercepts and halts the communication, and at 226 a notification for a user is generated to inform the user of the issue. If the domain name is found, then the verification moves onto the next step.

Next, the public key of the present SSL communication (generated automatically by the Web browser) is retrieved at 220 from a known public key list (222), and compared against the known public key associated with the domain name. The public key of the present communication is obtained by examining a certificate transmitted by the domain, which is used by the browser to encrypt the outgoing POST or PUT. The correct public key of the domain is stored and updated by the software in a separate job that is run daily. If the POST or PUT is not encrypted, the outgoing message is halted.

The verification process assumes completion of several prior steps: First, an initialization stage is executed whereby the consumer provides a list 210 of all "approved" domain names to which to transmit confidential information (steps 232 and 234). These would typically include all bank sites with which the consumer has an account, as well as any brokerage sites. This selection by the consumer would proceed by either finding their institution by name on a list provided by the software, or by explicitly entering the domain name of the desired site.

Also, the current public key associated with each domain on the consumer's list of approved sites must be maintained. As public keys typically have a one to two year lifetime, this maintenance will require the execution of a daily job that downloads current public keys from an Application Service Provider (ASP) hosting this service. The ASP maintains this list of public keys either through relationships with the major Certificate Authorities (e.g., Verisign, Equifax, etc.), or by independently visiting each site on the superlist of all (relevant) secure domains and examining the details of the transmitted Certificate.

The exclusion list include domains from which a consumer may frequently request information without requiring a secure channel, i.e. sites with which communication is allowed without any security check. These include the major search engines (Google, Yahoo, etc.), as well as other frequently-used resources such as freely accessed dictionaries (e.g. www.MiriamWebster.com) and encyclopedias (e.g. www.Wikipedia.org), as well as "search" queries at common e-commerce sites (e.g. www.Amazon.com). Many of these sites can be pre-loaded into the exclusion list. During the course of normal use, the consumer will have the option of adding new sites to their exclusion list, as described forthwith.

When an outgoing message is intercepted and halted by the module, the module will spawn a pop-up at 226 indicating to the consumer that communication is being attempted with an unsanctioned site. The consumer will then be given a number of options: 1) cease the attempted communication (203); 2) for the lifetime of the present session, allow all transmissions to this site (201); 3) add the site to the consumer's exclusion list (230), and allow transmission of the present message; and/or 4) add the site to the consumer's list 210 of sanctioned communication sites (228 and 230). This latter option requires the system to verify the public key of the added site as described above. The message is then processed according to the steps of comparing the public key of the present SSL communication with the known public key associated with the domain name, as described above.

In some embodiments, a warning message is augmented by an analysis of the domain name to determine if the site is attempting to spoof a legitimate banking site (e.g., www-.bankafamerica.com rather than www.bankofamerica.com). This analysis would utilize advanced text processing techniques, such as described in U.S. patent application Ser. No. 11/234,692, entitled, "Method and Apparatus for Automatic Entity Disambiguation" and assigned to Fair Isaac Corporation, the contents of which are incorporated by reference herein for all purposes. When such a spoof is deemed statistically likely, the warning message would indicate a heightened alert.

The system can be embodied in one or more software modules. Distribution channels for the software include direct-to-consumer downloads (from such consumer oriented sites as www.myFico.com) as well as through potential channel partners such as financial institutions and Internet Service Providers (ISPs).

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A client computer based method for executing a secure electronic transaction over a communications network, the method comprising:
    querying, by at least one data processor, an exclusion list with a domain name associated with a transaction site to determine if a security of the transaction site needs verification, the exclusion list comprising one or more domains that do not require a secure channel for communication;
    when the transaction site is not on the exclusion list and the electronic transaction does not include information sent from the client computer, the electronic transaction being encrypted with a public key, initiating, by at least one data processor, the verification by querying an allowed list with the domain name to determine if the transaction site is allowed to continue the electronic transaction; and
    when the domain name of the transaction site is not on the allowed list, by at least one data processor:
        generating a first notification for a user indicating that the electronic transaction is being conducted with an unsanctioned transaction site,
        receiving input from the user based on the first notification, and
        ceasing the electronic transaction, and
        adding the domain name associated with the transaction site to the exclusion list, the exclusion list being specific to the user.

2. A method in accordance with claim 1, further comprising, if the transaction site is on the allowed list, retrieving an encryption key for the transaction site from a known public key list.

3. A method in accordance with claim 2, further comprising determining if the encryption key received from the transaction site matches the public key from the known public key list.

4. A method in accordance with claim 3, if the encryption key received from the transaction site does not match the public key from the known public key list, generating a second notification of a potential issue for the user.

5. A method in accordance with claim 3, if the encryption key received from the transaction site matches the public key from the known public key list, continuing the electronic transaction with the transaction site.

6. A method in accordance with claim 1, wherein the querying the exclusion list with the domain name of the transaction site further includes comparing the domain name associated with the transaction site with a list of domain names in the exclusion list.

7. A method in accordance with claim 1, wherein the querying the allowed list with the domain name further includes comparing the domain name associated with the transaction site with a list of domain names in the allowed list.

8. A client computer based method for executing a secure electronic transaction over a communications network, the method comprising:
    intercepting, by at least one data processor, secure socket layer (SSL) communications with a transaction site on a server; and
    verifying, by at least one data processor, that a web session associated with the SSL communications is appropriately encrypted, the verifying comprising:
        querying an exclusion list with a domain name of the transaction site to determine if a security of the transaction site needs verification, the exclusion list being specific to a user and comprising one or more domains that do not require a secure channel for communication;

when the transaction site is not on the exclusion list and the SSL communications do not include information sent from the client computer, the SSL communications being encrypted with a public encryption key, querying an allowed list with the domain name to determine if the transaction site is allowed to continue the electronic transaction; and when the domain name of the transaction site is not on the allowed list, generating a notification for a user indicating that the electronic transaction is being conducted with an unsanctioned transaction site, receiving input from the user based on the notification, ceasing the electronic transaction, and adding the domain name associated with the transaction site to the exclusion list.

9. A method in accordance with claim 8, wherein the querying the exclusion list with the domain name of the transaction site further includes comparing the domain name of the transaction site with domain names in the exclusion list.

10. A method in accordance with claim 9, wherein the querying the allowed list with the domain name further includes comparing the domain name of the transaction site with domain names in the allowed list.

11. A method in accordance with claim 8, wherein the verifying further comprises comparing a SSL public key of the transaction site with a known public key list.

12. A method in accordance with claim 11, further comprising determining if the SSL public key of the transaction site matches the public encryption key in the known public key list.

13. A client system for executing a secure electronic transaction over a communications network, the system comprising:

a secure transaction module configured to intercept secure socket layer (SSL) communications from a transaction site on a server; and at least one data processor associated with the secure transaction module, the at least one data processor being configured to verify that a web session associated with the SSL communications is appropriately encrypted by:

querying an exclusion list with a domain name of the transaction site to determine if a security of the transaction site needs verification, the exclusion list being specific to a user and comprising one or more domains that do not require a secure channel for communication, when the transaction site is not on the exclusion list and the SSL communications do not include information sent from the client computer, the SSL communications being encrypted with a public encryption key, querying an allowed list with the domain name to determine if the transaction site is allowed to continue the electronic transaction; and when the domain name of the transaction site is not on the allowed list, generating a notification for a user indicating that the electronic transaction is being conducted with an unsanctioned transaction site, receiving input from the user based on the notification, ceasing the electronic transaction, and adding the domain name associated with the transaction site to the exclusion list.

14. A system in accordance with claim 13, further comprising a public key table accessible by the secure transaction module and having a list of known public encryption keys.

* * * * *